Figure 1:
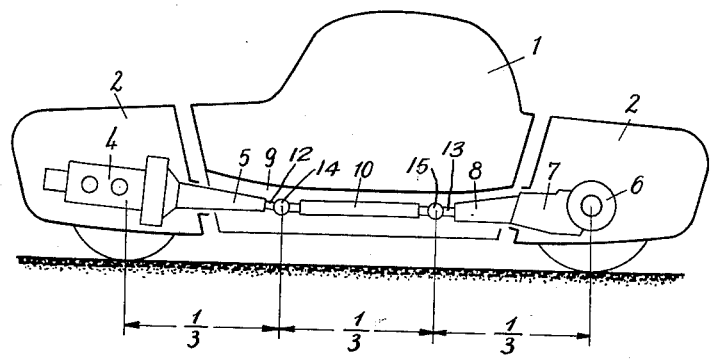

March 13, 1956  B. BARÉNYI  2,738,023
DRIVE ARRANGEMENT FOR SECTIONAL TYPE VEHICLE
Filed Oct. 25, 1951

Inventor
Béla Barényi
By Austin, Miche, Wilhelm &
Padlon
Attorneys

United States Patent Office 2,738,023
Patented Mar. 13, 1956

2,738,023
DRIVE ARRANGEMENT FOR SECTIONAL TYPE VEHICLE

Béla Barényi, Stuttgart-Rohr, Germany, assignor to Daimler-Benz Aktiengesellschaft, Stuttgart-Untertürkheim, Germany Application October 25, 1951, Serial No. 253,101

Claims priority, application Germany October 28, 1950

5 Claims. (Cl. 180—54)

The present invention relates to automotive vehicles of the cellular type construction, the engine of which is mounted in the front portion or cell thereof and is operatively connected to the rear axle differential by means of a drive shaft with a front and a rear universal joint, and it relates particularly to automotive vehicles of the above described type, the engine assembly of which includes a member protruding relatively far to the rear and thus locating the front universal joint relatively far from the engine block.

It is an object of the present invention to reduce the length of the drive shaft by locating its rear universal joint a relatively large distance forward of the rear axle by providing a forwardly protruding member of the rear axle differential assembly.

A further object of the present invention is to reduce drive shaft vibration and noise resulting therefrom and to insulate the center cell against such vibrations and noises as are produced by the engine and the transmission.

Another object of the present invention is to provide a forwardly protruding member on the rear axle differential assembly which member is preferably made of frustoconically shaped sheet metal in order to reduce the weight of the member as far as possible.

The present invention is especially adapted for vehicles of the cellular type construction, wherein the individual cells are substantially rigid and self-sustaining and are composed of separate front, rear and center sections or cells, and facilitates a favourable arrangement of the major drive assemblies in this type of vehicle. In vehicles of the sectional or cellular type it will be found expedient to design the protruding members of the engine and the rear axle differential assemblies in such a way that the distance of the front universal joint from the front axle and a distance of the rear universal joint from the rear axle are substantially equal. A particularly favourable utilization of the available space results in this latter case if the transmission and the differential are combined in a unitary structure.

According to the present invention the drive shaft between engine and differential can be dispensed with entirely when the protruding members of the engine assembly and of the differential assembly extend approximately to the center of the vehicle so that the ends of the shafts of these two assemblies can be directly connected by means of a universal joint at this point. The transmission of drive shaft vibration to the middle portion of a vehicle or to the center cell of a vehicle composed of three sections or cells can be avoided, if the engine and differential assemblies including their protruding members are only supported in the end portions or in the end cells of the vehicle and have no direct connection with the middle portion or the center cell of the vehicle.

The invention is illustrated in the accompanying drawing showing two embodiments.

In the drawing, Fig. 1 is a schematic longitudinal sectional view of a vehicle composed of separate sections having a drive shaft of reduced length.

Figure 2:
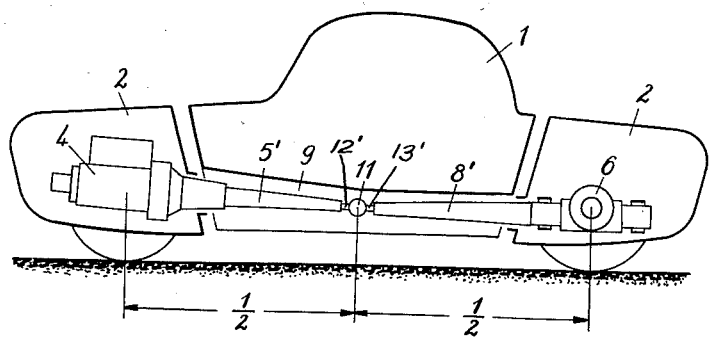

Fig. 2 shows the same vehicle as in Fig. 1 in which the two protruding members are so arranged and are of such length that no drive shaft is required between them.

In the drawing, the reference numeral 1 designates the center section or cell and the numeral 2 the two end sections or cells of a vehicle composed of three sections or cells. The individual sections or cells are connected to each other in any suitable manner, and may be connected, for example, as disclosed in my prior United States Patent No. 2,678,231, issued on May 11, 1954, entitled "Connecting Sleeve for Attaching Separable Vehicle Units Together," or as described and shown in my prior United States Patent No. 2,693,982, issued on November 9, 1954, entitled "Cell Type Structure Vehicle," or as shown and described in my prior United States Patent No. 2,710,770, issued on June 14, 1955, entitled "Passenger Motor Vehicle Having Separable End Sections Shaped Alike," or as shown in my prior Canadian Patent No. 510,426, issued on March 1, 1955, entitled "Motor Vehicle." The engine 4 includes a rearwardly protruding member 5 with a power transmission shaft 12 supported therein in any suitable manner. A differential 6 and transmission 7 are disposed in the rear section or cell of the vehicle, while a forwardly protruding member 8, in which a power transmission shaft 13 is supported in any suitable manner, is attached to the unitary structure formed by the transmission and the differential. The end walls of the end cell 2 adjacent the center cell 2 are constructed in such a manner as to provide flange-like apertures through which the members 5 and 8 extend while permitting play of the protruding members 5 and 8 relative to the bodies of the end sections 2. The members 5 and 8 protrude into a channel 9 provided at the bottom of the center section 1. The ends of the shafts 12 and 13 supported in the members 5 and 8 are connected to a drive shaft 10 by means of universal joints 14 and 15 respectively. The vehicle is so designed that the length of the drive shaft 10 approximates one third of the wheel base.

In the embodiment shown in Fig. 2 the two members 5′ and 8′ are substantially longer than in Fig. 1 so that the ends of the shafts 12′ and 13′ mounted therein can be directly connected by means of a single universal joint 11.

The front universal joint 14 of Figure 1 as well as the single universal joint 11 of Figure 2 are located at a substantialy distance rearwardly of the engine assembly, while the rear universal joint 15 of Figure 1 and the single universal joint 11 of Figure 2 are located at a substantial distance forwardly of the rear axle, preferably by a distance at least as great as the diameter of the vehicle wheel.

What I claim is:

1. In a motor vehicle of the cellular type construction having a plurality of independent, self-sustaining cells including a front cell, a center cell and a rear cell, the combination comprising an engine assembly located in said front cell, a first member with shaft means connected to said engine assembly and extending therefrom in a rearward direction, a rear axle differential in the rear end cell having a rear axle and including a second member with shaft means, said second member and said second-mentioned shaft means projecting from said rear axle differential forwardly, universal joint means below said center cell interconnecting said two shaft means, said first member with said first-mentioned shaft means being of such length as to locate said universal joint means at a substantial distance rearwardly of said engine assembly, and said second member with said second-mentioned shaft means being of such length as to locate said universal joint means forwardly of said rear axle by a distance at least equal to the diameter of the vehicle wheel, said members extending below said center cell in unsupported relation therewith and enabling relative pivotal movement of said rear axle differential with respect to said engine assembly.

2. The combination according to claim 1 wherein said forwardly projecting member is a substantially frusto-conical shaped sheet metal structure.

3. The combination according to claim 1, further comprising a transmission, and wherein said rear axle differential and said transmission form a unitary structure with each other.

4. In a motor vehicle according to claim 1, wherein said forwardly projecting member consists essentially of a sheet metal sleeve having the shape of a truncated cone.

5. In a motor vehicle of the cellular type construction composed of a separate center cell and two separate end cells, the combination comprising an engine assembly located in the front end cell, a first member connected to said engine assembly projecting therefrom in a rearward direction, a power transmitting shaft mounted within said first member, a universal joint connected with said first power transmitting shaft, said first member being of such length as to locate said universal joint at a substantial distance from said engine assembly, a rear axle differential in the rear end cell including a second member projecting forwardly therefrom, a second power transmitting shaft mounted within said second member and connected at its forward end with said universal joint, said second member being of such length as to locate said universal joint in front of the rear axle by a distance at least as great as the diameter of the vehicle wheel, said first and said second members providing relative pivoted movement of said rear axle differential with respect to said engine assembly, both said members with said first and second power transmitting shafts extending substantially to the center of the wheel base in unsupported relation with said center cell so that the ends of the power transmitting shafts may be directly connected by said universal joint.

References Cited in the file of this patent

UNITED STATES PATENTS

| | | |
|---|---|---|
| 1,313,429 | Lenfestey | Aug. 19, 1919 |
| 2,240,317 | Swenson | Apr. 29, 1941 |
| 2,373,356 | Thoms et al. | Apr. 10, 1945 |

FOREIGN PATENTS

| | | |
|---|---|---|
| 463,990 | France | Jan. 5, 1914 |
| 100,789 | Great Britain | Feb. 15, 1917 |
| 486,968 | Great Britain | June 14, 1938 |
| 401,044 | Italy | Jan. 4, 1943 |
| 68,753 | Switzerland | Mar. 10, 1914 |